(12) United States Patent
Mizoue

(10) Patent No.: US 9,459,779 B2
(45) Date of Patent: Oct. 4, 2016

(54) IMAGE DISPLAY APPARATUS, IMAGE ENLARGEMENT METHOD, AND IMAGE ENLARGEMENT PROGRAM

(71) Applicant: FUJITSU LIMITED, Kawasaki-shi, Kanagawa (JP)

(72) Inventor: Hiroyuki Mizoue, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 132 days.

(21) Appl. No.: 14/576,968

(22) Filed: Dec. 19, 2014

(65) Prior Publication Data

US 2015/0103029 A1   Apr. 16, 2015

Related U.S. Application Data

(63) Continuation of application No. PCT/JP2012/067228, filed on Jul. 5, 2012.

(51) Int. Cl.
*G06F 3/0484* (2013.01)
*G06F 3/0488* (2013.01)

(52) U.S. Cl.
CPC ......... *G06F 3/04845* (2013.01); *G06F 3/0484* (2013.01); *G06F 3/04883* (2013.01); *G06F 2203/04806* (2013.01)

(58) Field of Classification Search
CPC .. G06F 3/04883; G06F 3/0414; G06F 3/048; G06F 2203/04108; G06F 2203/04801; G06F 2203/04803; G06F 3/0346; G06F 3/03547; G06F 3/038; G06F 3/041; G06F 3/0418; G06F 3/0481; G06F 3/04812
See application file for complete search history.

(56) References Cited

U.S. PATENT DOCUMENTS

| 2004/0012579 A1* | 1/2004 | Nagasaka ............. G06F 3/0414 345/204 |
| 2005/0060658 A1* | 3/2005 | Tsukiori ................ G06F 3/0481 715/765 |
| 2009/0219290 A1 | 9/2009 | Kakie |
| 2011/0063327 A1 | 3/2011 | Shimizu |
| 2011/0285665 A1* | 11/2011 | Matsumoto ............. G06F 3/044 345/174 |
| 2012/0162684 A1* | 6/2012 | Matulic .............. H04N 1/00413 358/1.13 |

FOREIGN PATENT DOCUMENTS

| JP | 4-36858 | 2/1992 |
| JP | 9-161088 | 6/1997 |
| JP | 2001-66985 | 3/2001 |

(Continued)

OTHER PUBLICATIONS

Patent Abstracts of Japan, Publication No. 04-036858, published Feb. 6, 1992.

(Continued)

*Primary Examiner* — Gerald Johnson
(74) *Attorney, Agent, or Firm* — Staas & Halsey LLP

(57) ABSTRACT

An image display apparatus includes a display unit; a storage unit; and a processor configured to make the display unit display an image including a plurality of ruled lines, to detect coordinates designated by a user by an input operation on a display screen of the display unit, and to obtain a trajectory of the detected coordinates, and to make the display unit enlarge a part of the image including the ruled lines by an enlargement rule selected based on an arrangement of intersections of the trajectory of the obtained coordinates and the ruled lines, and display the enlarged part of the image.

15 Claims, 27 Drawing Sheets

(56) References Cited

FOREIGN PATENT DOCUMENTS

| | | |
|---|---|---|
| JP | 2005-141463 | 6/2005 |
| JP | 2009-161088 | 7/2009 |
| JP | 2009-258972 | 11/2009 |
| JP | 2011-60111 | 3/2011 |
| JP | 2011-210204 | 10/2011 |

OTHER PUBLICATIONS

Patent Abstracts of Japan, Publication No. 09-161088, published Jun. 20, 1997.
Patent Abstracts of Japan, Publication No. 2001-066985, published Mar. 16, 2001.
Patent Abstracts of Japan, Publication No. 2005-141463, published Jun. 2, 2005.
Patent Abstracts of Japan, Publication No. 2009-258972, published Nov. 5, 2009.
Patent Abstracts of Japan, Publication No. 2011-060111, published Mar. 24, 2011.
Patent Abstracts of Japan, Publication No. 2011-210204, published Oct. 20, 2011.
International Search Report mailed Oct. 2, 2012, in corresponding International Patent Application No. PCT/JP2012/067228.
Patent Abstracts of Japan, Publication No. 2009-161088, Published Jul. 23, 2009.
Extended European Search Report dated Aug. 20, 2015 in corresponding European Patent Application No. 12880589.2.

* cited by examiner

| CONTRACT TYPE | | A | B | C | D |
|---|---|---|---|---|---|
| MATURITY REFUND | | JP¥ 1,000K | JP¥ 700K | JP¥ 500K | JP¥ 300K |
| INSURED AMOUNT | DEATH OR RESIDUAL DISABILITY | JP¥ 10,000K | JP¥ 1,000K | JP¥ 5,000K | JP¥ 3,000K |
| | HOSPITALIZATION BENEFIT PER DAY | JP¥ 10K | JP¥ 7K | JP¥ 5K | JP¥ 3K |
| | OUTPATIENT BENEFIT PER DAY | JP¥ 5K | JP¥ 2.5K | JP¥ 2.5K | JP¥ 1.5K |
| | LIABILITY | JP¥ 10,000K | JP¥ 5,000K | JP¥ 3,000K | JP¥ 2,500K |
| | BAGGAGE INSURANCE | JP¥ 300K | JP¥ 250K | JP¥ 200K | JP¥ 150K |
| PREMIUM | 3-YEAR COVERAGE | JP¥ 28,370 | JP¥ 19,980 | JP¥ 14,215 | JP¥ 8,550 |
| | 5-YEAR COVERAGE | JP¥ 14,440 | JP¥ 12,235 | JP¥ 8,755 | JP¥ 5,270 |

FIG.7
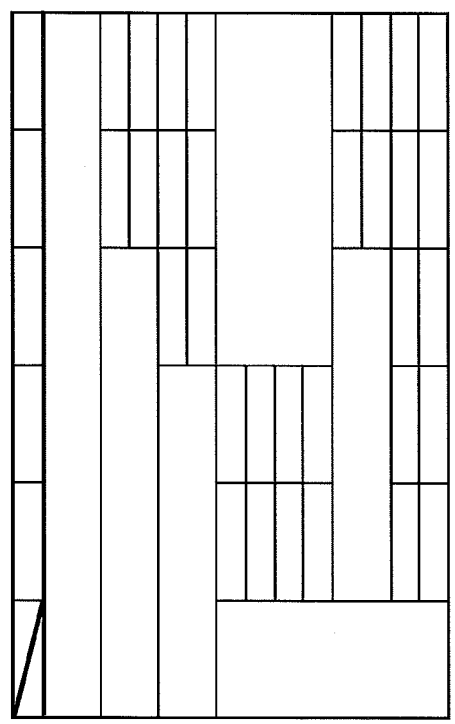
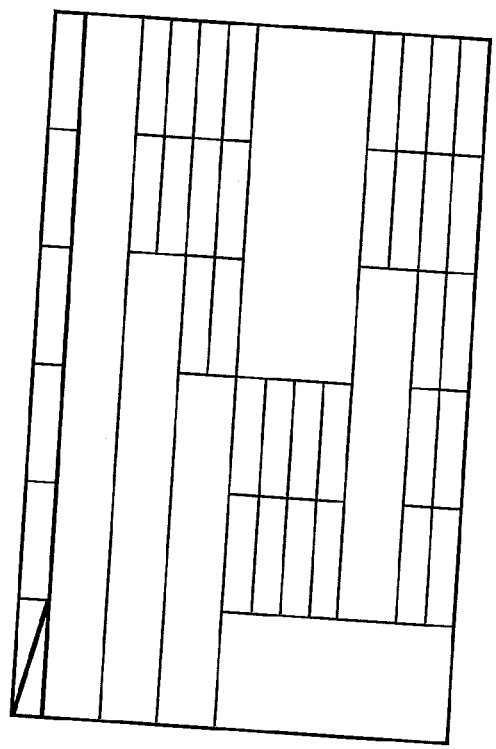

| | COORDINATES OF START POINT | COORDINATES OF END POINT | OUTER FRAME LINE |
|---|---|---|---|
| RULED LINE A | (0, 0) | (0, 8) | |
| RULED LINE B | (0, 8) | (0, 10) | |
| RULED LINE C | (0, 8) | (4, 8) | |
| RULED LINE X | (0, 15) | (4, 14) | |
| ... | | | |
| | | | |

|  | COORDINATES OF START POINT | COORDINATES OF END POINT | OUTER FRAME LINE |
|---|---|---|---|
| RULED LINE A | (0, 0) | (0, 8) | ○ |
| RULED LINE B | (0, 8) | (0, 10) | ○ |
| RULED LINE C | (0, 8) | (4, 8) | — |
| ... | | | |
| RULED LINE Z | (20, 15) | (24, 15) | ○ |
| | | | |

|  | COORDINATES |
|---|---|
| INTERSECTION a | (0, 0) |
| INTERSECTION b | (0, 8) |
| INTERSECTION c | (0, 10) |
| ... | |
| | |
| | |

FIG.12

| | |
|---|---|
| INITIAL POINT | (13, 4.5) |
| Xmin | 13 |
| Xmax | 15 |
| Ymin | 4.5 |
| Ymax | 7.5 |
| TERMINAL POINT | (15, 7.5) |

| INTERSECTION No(i) | COORDINATES | CROSSED RULED LINE | ANGLE FORMED BY VECTOR (POINT i-1 TO POINT i) RELATIVE TO REFERENCE DIRECTION (°) |
|---|---|---|---|
| INITIAL POINT | (26, 8.5) | | |
| 1 | (24, 8.5) | RULED LINE D | 5 |
| 2 | (20, 8.7) | RULED LINE E | 10 |
| 3 | (19, 9) | RULED LINE F | 5 |
| ... | | | |
| 14 | (24, 3.2) | | 170 |
| 15 (TERMINAL POINT) | (27, 3.9) | | |

| ▲No(i) | COORDINATES | CLASSIFICATION |
|---|---|---|
| 1 | (8, 6) | INSIDE |
| 2 | (4, 5) | OUTSIDE |
| 3 | (8, 5) | OUTSIDE |
| 4 | (12, 5) | OUTSIDE |
| 5 | (4, 6) | OUTSIDE |
| 6 | (12, 6) | OUTSIDE |
| 7 | (4, 7) | OUTSIDE |
| 8 | (8, 7) | OUTSIDE |
| 9 | (12, 7) | OUTSIDE |

FIG.24
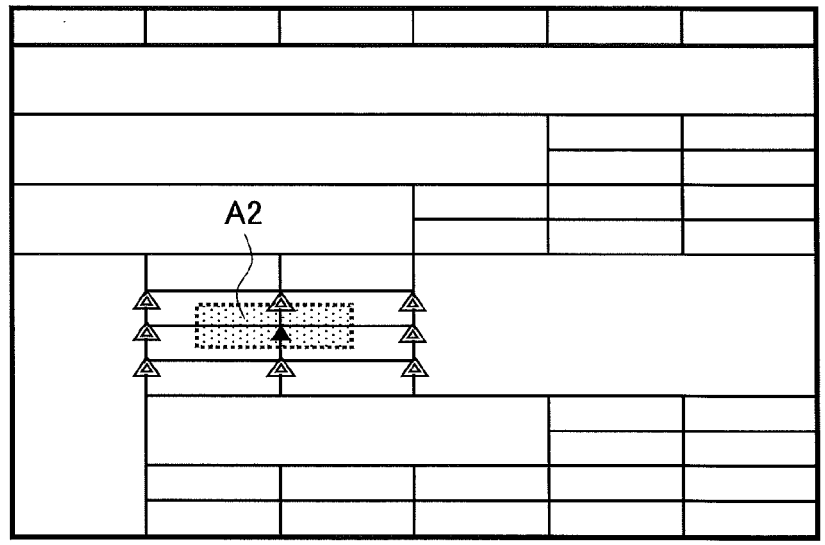
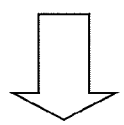
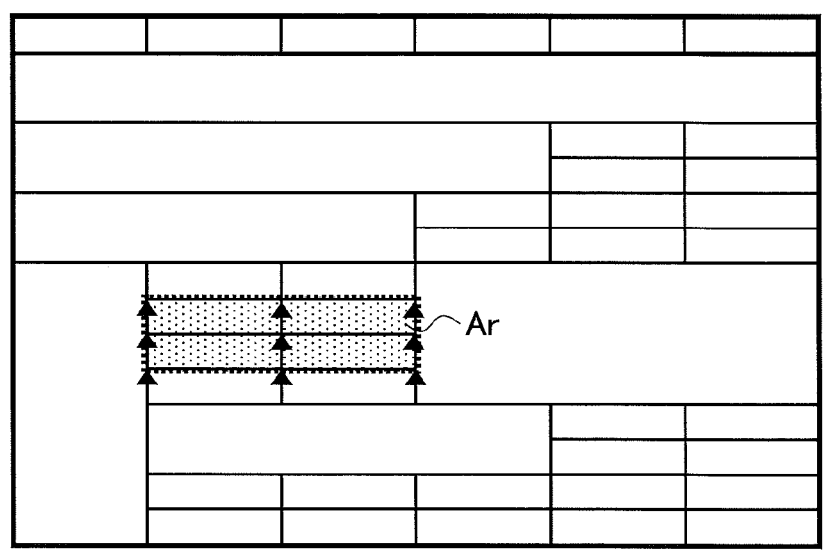

| ▲No(i) | COORDINATES | CLASSIFICATION |
|---|---|---|
| 1 | (12, 4) | INSIDE |
| 2 | (12, 5) | INSIDE |
| 3 | (12, 6) | INSIDE |
| 4 | (12, 7) | INSIDE |
| 5 | (12, 8) | INSIDE |
| 6 | (12, 9) | INSIDE |
| 7 | (8, 4) | OUTSIDE |
| 8 | (8, 5) | OUTSIDE |
| ... | | |
| 14 | (16, 8) | OUTSIDE |

FIG.26
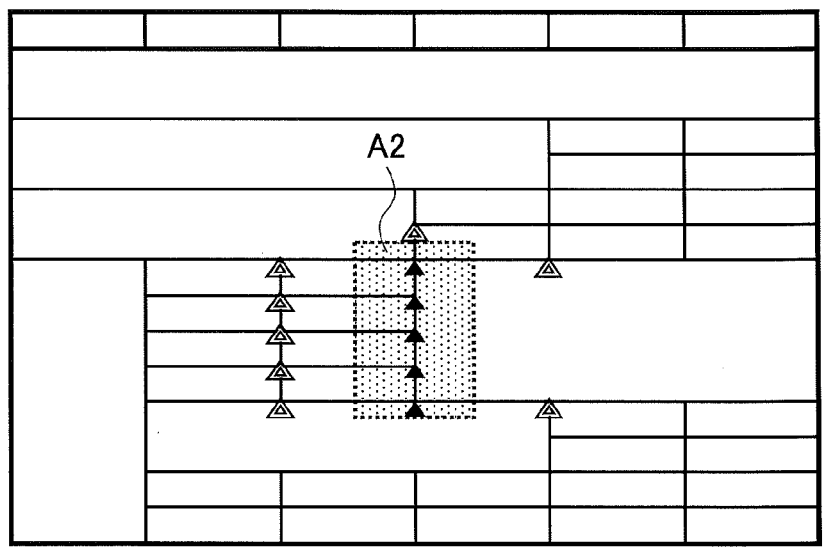
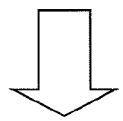
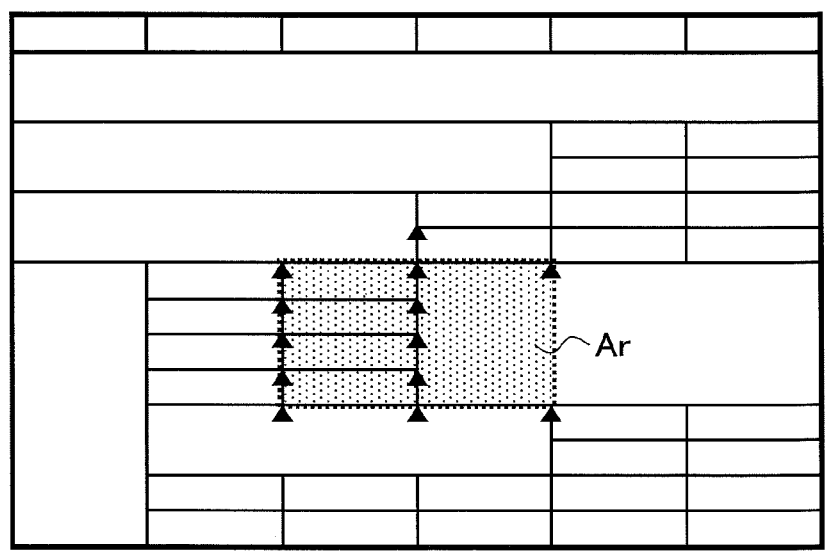

| ▲No(i) | COORDINATES | CLASSIFICATION |
|---|---|---|
| 1 | (12, 8) | INSIDE |
| 2 | (16, 8) | INSIDE |
| 3 | (20, 8) | INSIDE |
| 4 | (24, 8) | INSIDE |
| 5 | (12, 7) | OUTSIDE |
| 6 | (16, 7) | OUTSIDE |
| 7 | (20, 7) | OUTSIDE |
| 8 | (24, 7) | OUTSIDE |
| ... | | |
| 14 | (24, 9) | OUTSIDE |

FIG.28
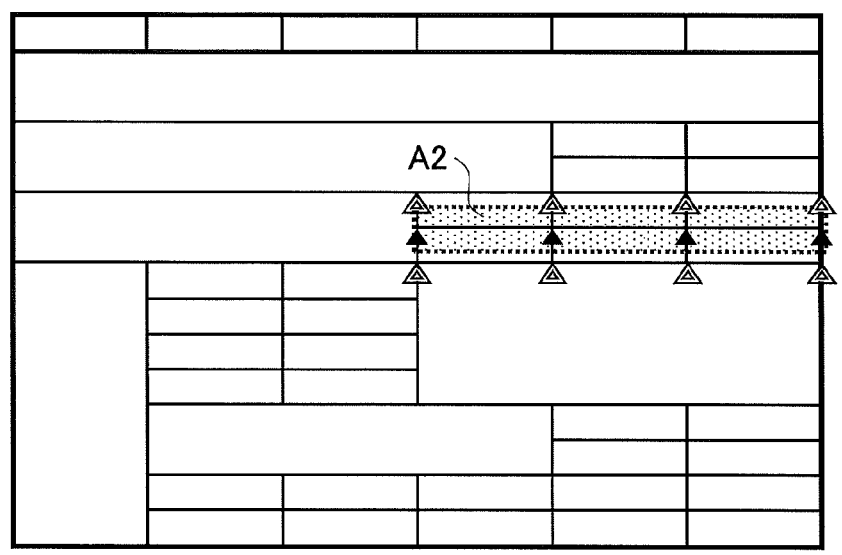
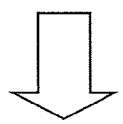
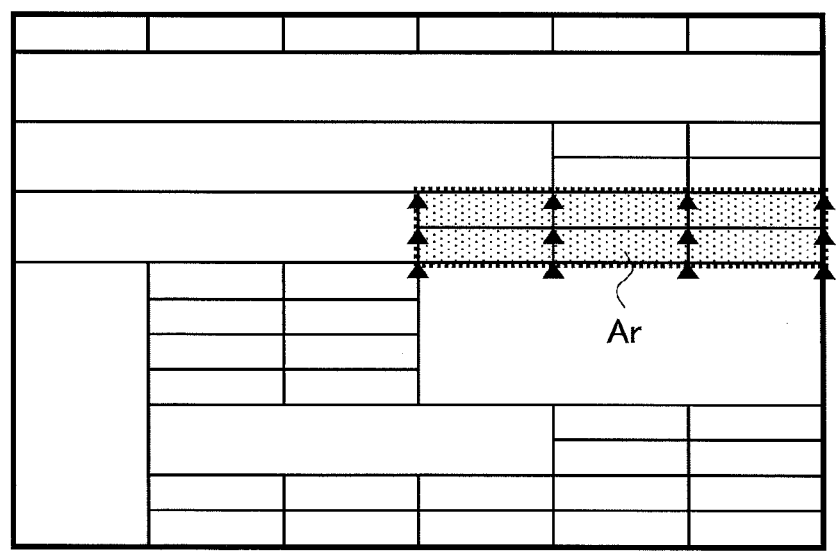

FIG.29

| ▲No(i) | COORDINATES | POSITION |
|---|---|---|
| 1 | (24, 9) | INSIDE |
| 2 | (24, 8) | INSIDE |
| 3 | (20, 8) | INSIDE |
| 4 | (20, 9) | INSIDE |
| 5 | (16, 9) | OUTSIDE |
| ... | | |
| 24 | (24, 3) | INSIDE |

16E

FIG.30
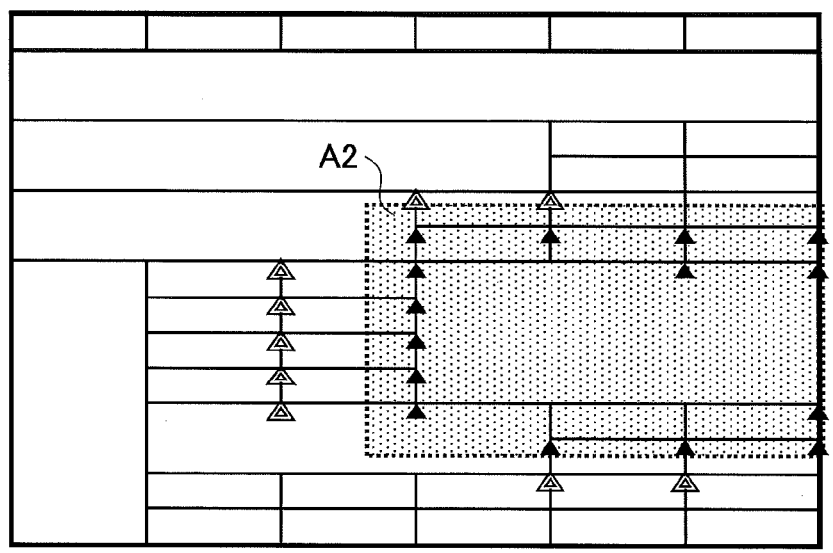
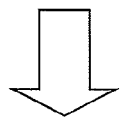
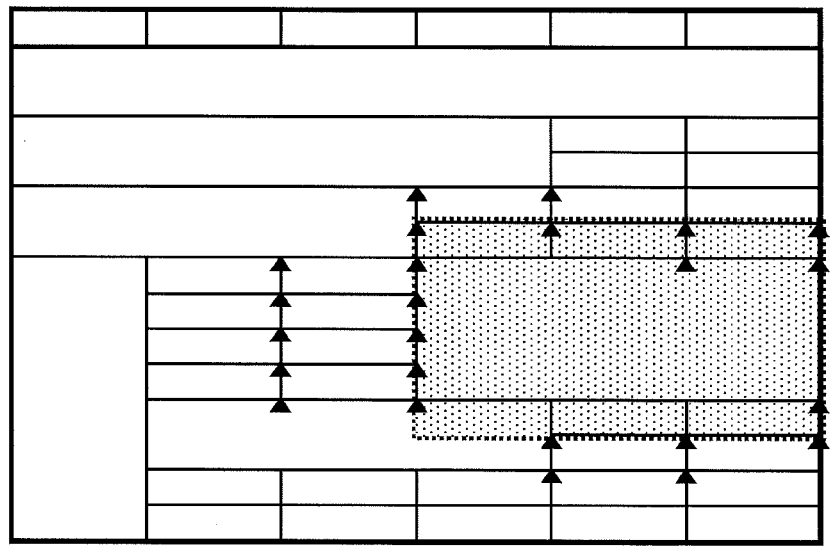

IMAGE DISPLAY APPARATUS, IMAGE ENLARGEMENT METHOD, AND IMAGE ENLARGEMENT PROGRAM

CROSS-REFERENCE TO RELATED APPLICATIONS

This application is a continuation application of International Application PCT/JP2012/067228 filed on Jul. 5, 2012 and designated the U.S., the entire contents of which are incorporated herein by reference.

FIELD

The present invention relates to an image display apparatus, an image enlargement method, and an image enlargement program.

BACKGROUND

Mobile terminals that can be carried around by users have become popular. Since a mobile terminal has a small display screen, when displaying an image content as a whole, there are cases where information included in the image is displayed so small that it is hard to see. Therefore, the user often desires to enlarge a part of the image to be displayed. Also, when using a personal computer or the like, if the size of an image content is great, a user may often desire to enlarge a part of the image to be displayed.

Relating to this, an information input device has been known with which a user can input information by a pen. This information input device executes an enlargement process of a display magnification factor which may be set twice greater if a user draws a circle by the pen, or the display magnification factor may be set three times greater if a user draws a triangle by the pen.

RELATED-ART DOCUMENTS

Patent Documents

[Patent Document 1]
  Japanese Laid-open Patent Publication No. 09-161088
  However, when using the above information input device, if a user desires to enlarge and see a specific part of an image content, the user needs to do an operation while estimating an appropriate magnification factor to obtain a seeable image. Also, the user may need to do troublesome operations such as scrolling the image so that the part which the user wants to view fits into the display screen. Therefore, the user cannot do an intuitive enlargement operation.

SUMMARY

According to at least one embodiment of the present invention, an image display apparatus includes a display unit; a storage unit; and a processor configured to make the display unit display an image including a plurality of ruled lines, to detect coordinates designated by a user by an input operation on a display screen of the display unit, and to obtain a trajectory of the detected coordinates, and to make the display unit enlarge a part of the image including the ruled lines by an enlargement rule selected based on an arrangement of intersections of the trajectory of the obtained coordinates and the ruled lines, and display the enlarged part of the image.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 3 is a diagram illustrating a state where an image content is display as a whole;

FIG. 4 is a diagram illustrating a state where a region A1 in FIG. 3 is enlarged and displayed;

FIG. 7 is a diagram illustrating a state where the tilt of an obliquely displayed image content is corrected by a tilt correction process;

FIG. 8 is a diagram illustrating a part of ruled lines (a ruled line A, a ruled line B, a ruled line C, and a ruled line X) extracted from an image content;

FIG. 9 is an example of a list of ruled-lines 16A registered in a memory unit 16 or the like;

FIG. 10 is a diagram illustrating a state where information indicating outer frame lines is assigned to ruled lines in a list of ruled-lines 16A;

FIG. 11 is a diagram illustrating an example of a list of intersections between ruled-lines 16B generated by an enlargement preprocess unit 42;

FIG. 12 is an example of input trajectory information 16C obtained by a trajectory information obtainment unit 44;

FIG. 13 is an example of a list of intersections between a trajectory and ruled-lines 16D generated by an intersection list generation unit 46;

FIG. 23 is a diagram illustrating an example of a list of adjacent intersections 16E for case (a) in pattern (2);

FIG. 24 is a diagram illustrating a state where a region to be enlarged Ar is determined for case (a) in pattern (2);

FIG. 25 is a diagram illustrating an example of a list of adjacent intersections 16E for case (b) in pattern (2);

FIG. 26 is a diagram illustrating a state where a region to be enlarged Ar is determined for case (b) in pattern (2);

FIG. 27 is a diagram illustrating an example of a list of adjacent intersections 16E for case (c) in pattern (2);

FIG. 28 is a diagram illustrating a state where a region to be enlarged Ar is determined for case (c) in pattern (2);

FIG. 29 is a diagram illustrating an example of a list of adjacent intersections 16E for case (d) in pattern (2);

FIG. 30 is a diagram illustrating a state where a region to be enlarged Ar is determined for case (d) in pattern (2);

DESCRIPTION OF EMBODIMENTS

In the following, embodiments of the present invention will be described with reference to the accompanying drawings.

Embodiments

In the following, embodiments of an image display apparatus, an image enlargement method, and an image enlargement program will be described with reference to the drawings.

[Hardware Configuration]

Figure 1:
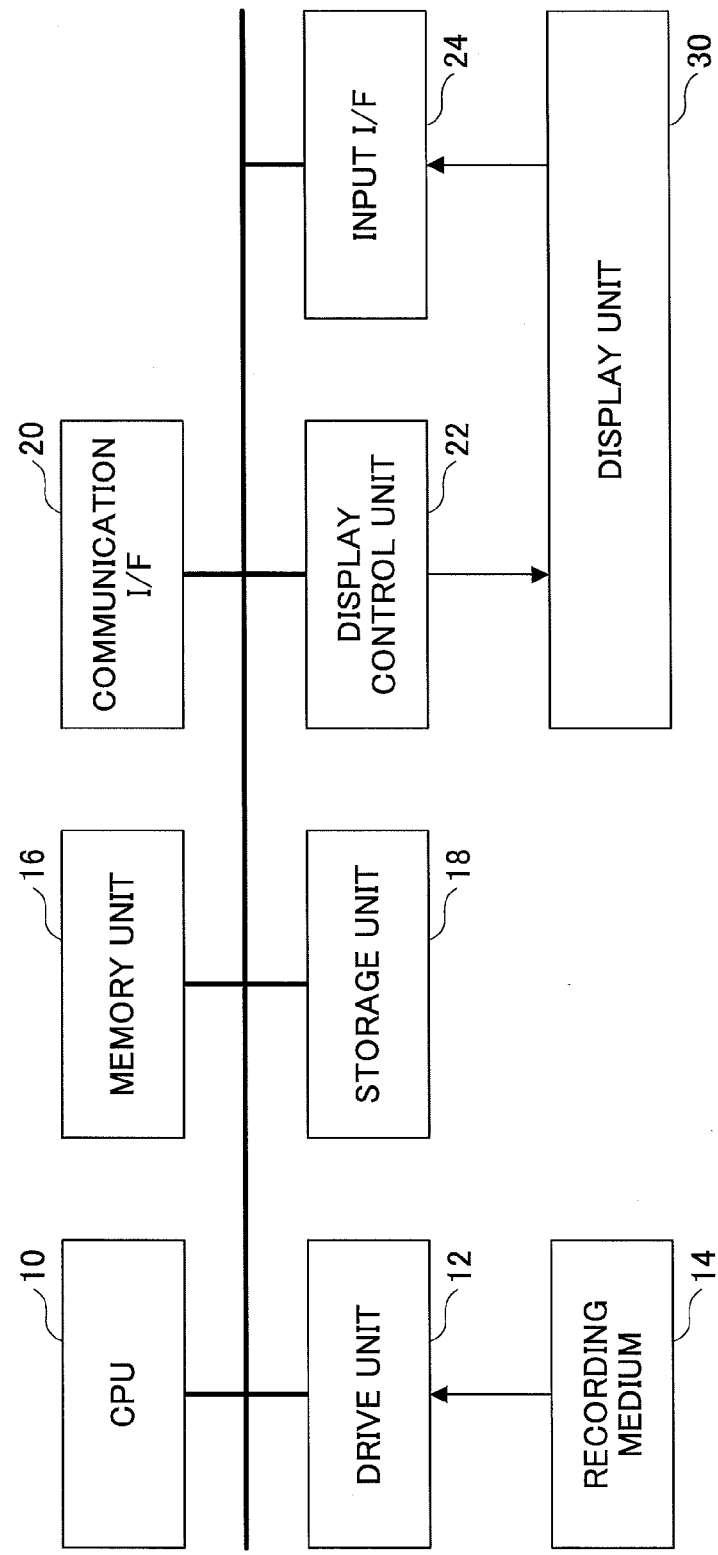
FIG. 1 is a hardware configuration example of an image display apparatus 1 according to an embodiment of the present invention.

FIG. 1 is a hardware configuration example of an image display apparatus 1 according to an embodiment of the present invention. The image display apparatus 1 includes, for example, a CPU (Central Processing Unit) 10, a drive unit 12, a memory unit 16, a storage unit 18, a communication interface 20, a display control unit 22, an input interface 24, and a display unit 30. These elements are connected with each other via a bus, a serial communication channel, or the like. The image display apparatus 1 is, for example, a tablet PC (personal computer) that can be carried around by a user.

The CPU 10 is a processor that includes, for example, a program counter, an instruction decoder, various arithmetic units, an LSU (Load/Store Unit), general-purpose registers, and the like. The drive unit 12 is a unit that can read a program or data from a recording medium 14. When the recording medium 14 storing a program is mounted on the drive unit 12, the program is installed from the recording medium 14 to the storage unit 18 via the drive unit 12. The recording medium 14 is a portable recording medium, for example, a CD (Compact Disc), a DVD (Digital Versatile Disc) a USB (Universal Serial Bus) memory, or the like. Installation of a program can be executed not only by the recording medium 14 as above, but also by the communication interface 20 that downloads a program from another computer via a network and installs the program to the storage unit 18. Also, a program may be stored beforehand in the storage unit 18, a ROM, or the like at shipment of the image display apparatus 1.

The memory unit 16 is, for example, a RAM (Random Access Memory), and the storage unit 18 is, for example, an HDD (Hard Disk Drive) or a SSD (Step Solid State Drive). The communication interface 20 accesses a network such as the Internet via wireless communication. The display control unit 22 generates an image to be displayed by the display unit 30. The input interface 24 executes a process to detect a position, or coordinates, for example, of a pen-input on the display screen of the display unit 30, and to write the position in the memory unit 16.

The display unit 30 is, for example, an LCD (Liquid Crystal Display). The display unit 30 includes functions to display an image that is generated by the display control unit 22; and to detect coordinates designated by a user by contacting the display screen with a pen. The display unit 30 uses, for example, an electromagnetic induction method to detect coordinates designated by a user. The detection method of the display unit 30 is not limited to an electromagnetic induction method, but may be a resistance film method, an electrostatic method, a light reflection method, or a light scanning method. If the display unit 30 adopts a light reflection method, a pen that reflects light is used.

Note that the display unit 30 is not limited to that having a function to detect coordinates designated by a pen, but may be that having a function to detect coordinates designated by a touch operation, for example, by a finger of a user.

[Functional Configuration]

Figure 2:
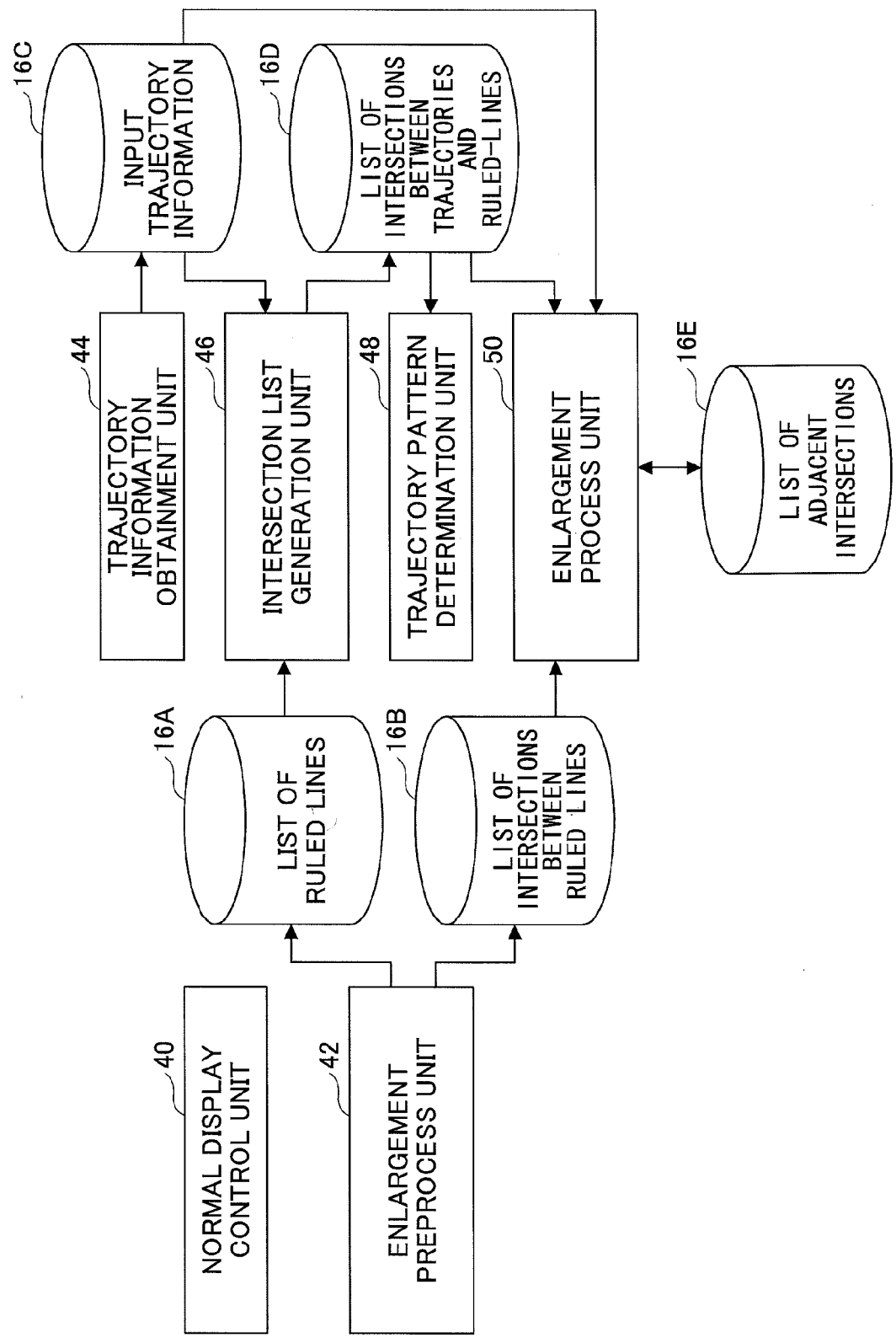
FIG. 2 is a functional configuration example of an image display apparatus 1.

FIG. 2 is a functional configuration example of the image display apparatus 1. The image display apparatus 1 includes a normal display control unit 40, an enlargement preprocess unit 42, a trajectory information obtainment unit 44, an intersection list generation unit 46, a trajectory pattern determination unit 48, and an enlargement process unit 50, which are functional units that function when the CPU 10 executes programs. Note that these functional blocks do not necessarily need to be implemented as explicitly separated programs, but they may be subroutines and/or functions called by other programs. Also, a part of the functional blocks may be implemented by hardware such as an IC (Integrated Circuit), an FPGA (Field Programmable Gate Array), or the like.

Also, the image display apparatus 1 generates a list of ruled-lines 16A, a list of intersections between ruled-lines 16B, input trajectory information 16C, a list of intersections between a trajectory and ruled-lines 16D, a list of adjacent intersections 16E, and the like, in the memory unit 16 or the like to use them in a process.

The normal display control unit 40 makes the display unit 30 display an image content stored in the storage unit 18 or the like by a display magnification factor set by a user via the display control unit 22 (omitted below). The display magnification factor can be set to, for example, "entire display" (automatically set the display magnification factor so that the entire image content is displayed), 100%, 75%, the like.

Figure 3:
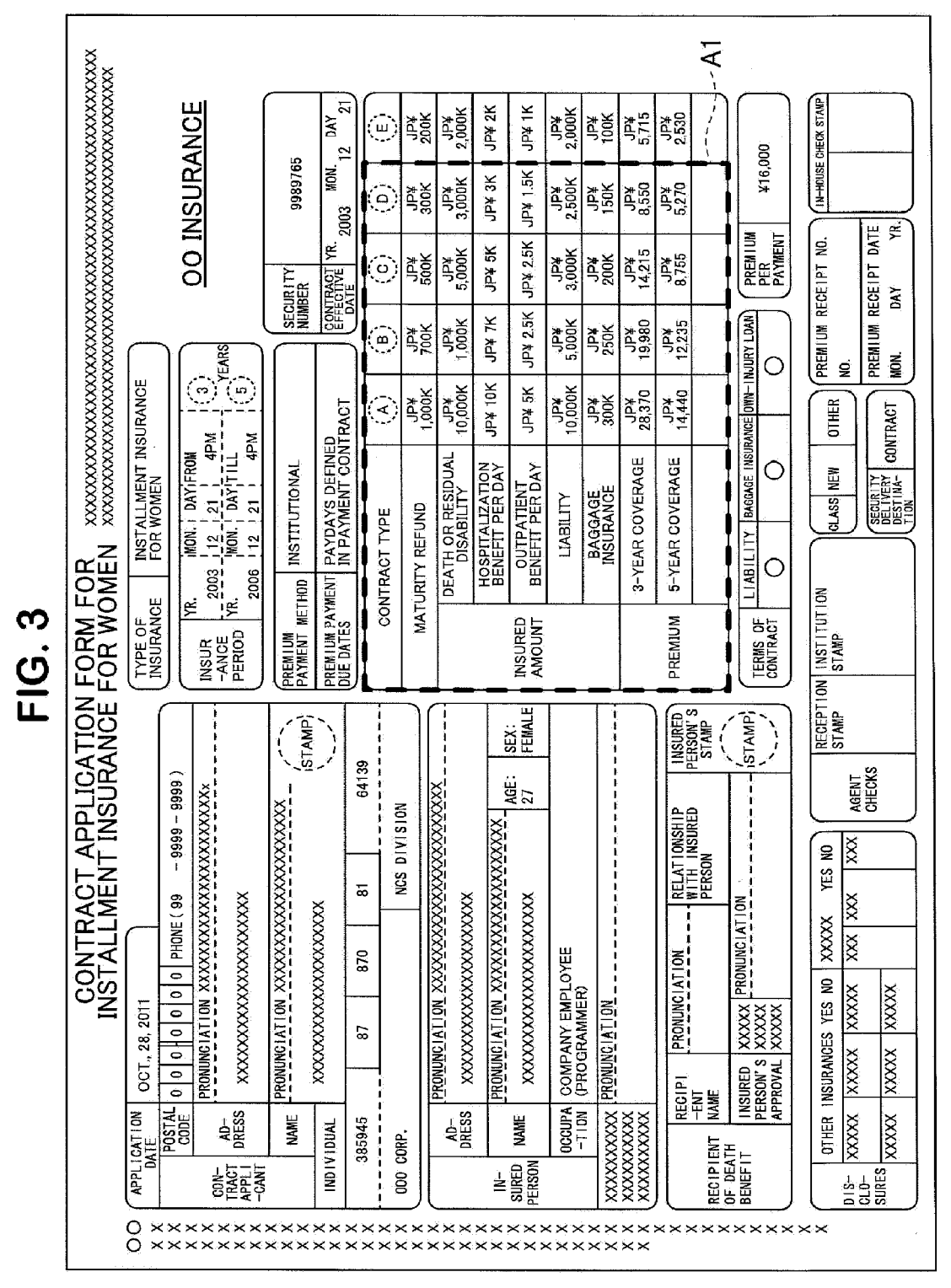

Here, since a tablet-type PC has a small display screen for the display unit 30, when displaying an image content by the entire display, there are cases where information included in the image is displayed so small that it is hard to see. Therefore, a user often desires to enlarge a part of the image to be displayed. FIG. 3 is a diagram illustrating a state where an image content is displayed by the entire display. In FIG. 3, a region A1 enclosed by a dashed line designates a region which a user desires to enlarge and display. FIG. 4 is a diagram illustrating a state where the region A1 in FIG. 3 is enlarged and displayed.

However, it is difficult for a user to determine a display magnification factor to make the region A1 suitably fit on the display screen of the display unit 30, either by determining and inputting a numerical value of the display magnification factor, or by a specific touch operation for enlargement as done on a cellular phone in recent years. Even in the latter case, the user may need to perform troublesome operations such as alternately performing enlargement operations and scroll operations.

On the other hand, using the image display apparatus 1 in the present embodiment, appropriate enlargement and displaying can be performed based on an intuitive operation by a user by executing the following process,

[Process for Enlargement and Displaying]

Figure 5:
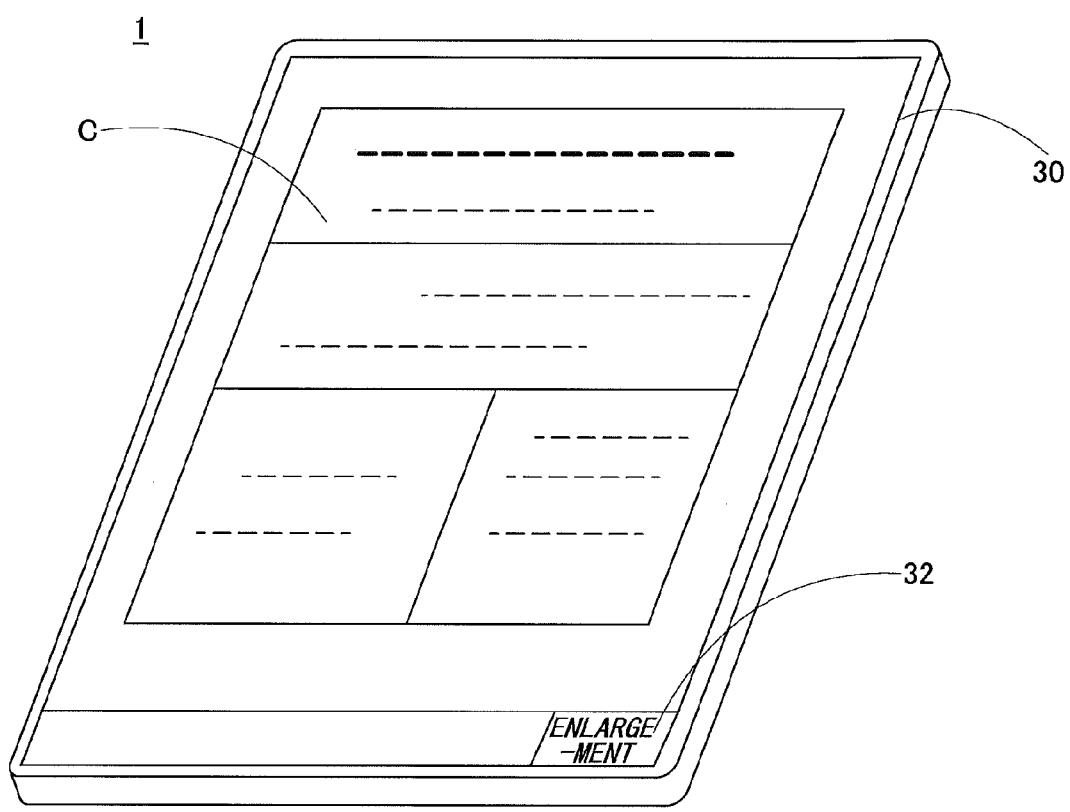
FIG. 5 is an external view of a display unit 30 of an image display apparatus 1 having an image content C displayed as a whole.

FIG. 5 is an external view of the display unit 30 of the image display apparatus 1 having an image content C entirely displayed. In the state where the image content C is entirely displayed as illustrated in FIG. 5, for example, an enlargement command switch 32 is set on the display screen of the display unit 30.

When the enlargement command switch 32 is touched by a pen, the enlargement preprocess unit 42, the intersection list generation unit 46, the trajectory pattern determination unit 48, and the enlargement process unit 50 are activated to execute the following process. Note that a starting trigger of the following process is not limited to the enlargement command switch 32. The image display apparatus 1, for example, may receive an enlargement command from a user by voice recognition.

Figure 6:
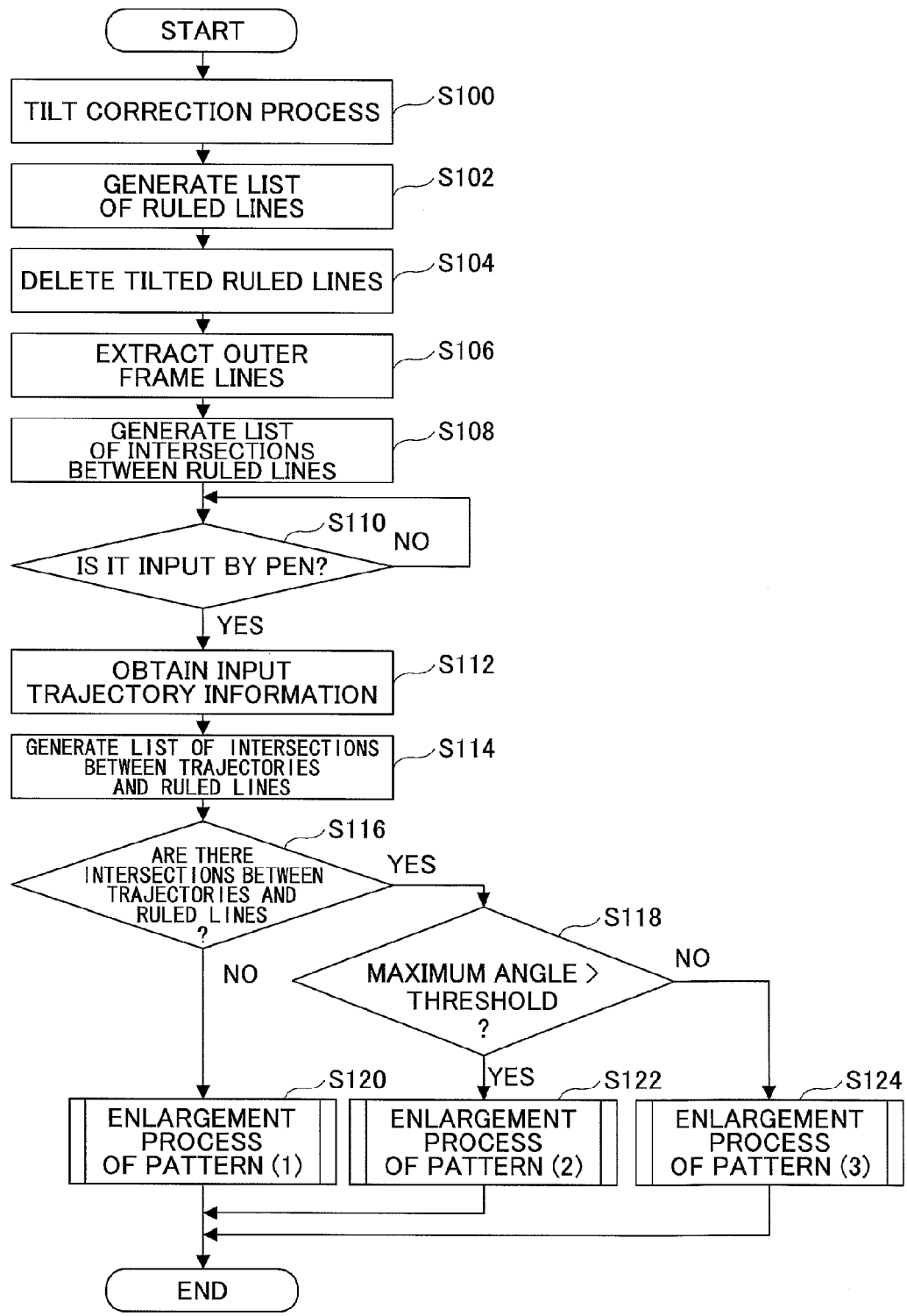
FIG. 6 is an example of a flowchart of an enlargement and displaying process.

FIG. 6 is an example of a flowchart of an enlargement and displaying process. This flowchart starts when, for example, the enlargement command switch 32 is touched by a pen or the like.

First, the enlargement preprocess unit 42 executes a tilt correction process (Step S100). Although the tilt correction process may not be required for an image content of a file for spreadsheet software or word processing software, it is desirable to execute the tilt correction process for an image content of PDF (Portable Document Format) based on scan data or the like.

The enlargement preprocess unit 42 executes, for example, a process to extract line-shaped elements from the image content by extracting characteristic points having a certain brightness difference or greater, or by executing a Hough transform and the like, and then, applies a rotation process to the image content so that slopes of the lines becomes horizontal or vertical. FIG. 7 is a diagram illustrating a state where a tilt of an obliquely displayed image content is corrected by the tilt correction process.

Next, the enlargement preprocess unit 42 extracts ruled lines from the image content to generate a list of ruled-lines 16A, which is information about the ruled lines, and to register the list in the memory unit 16 or the like (Step S102). If the image content is a file for spreadsheet software or word processing software, the list of ruled-lines 16A is generated with reference to data accompanying the file. Also, if the image content is a PDF file or the like, ruled lines are extracted among the line-shaped elements extracted as above, by extracting lines having the thickness within a predetermined width, to generate the list of ruled-lines 16A.

Figures 8, 9:
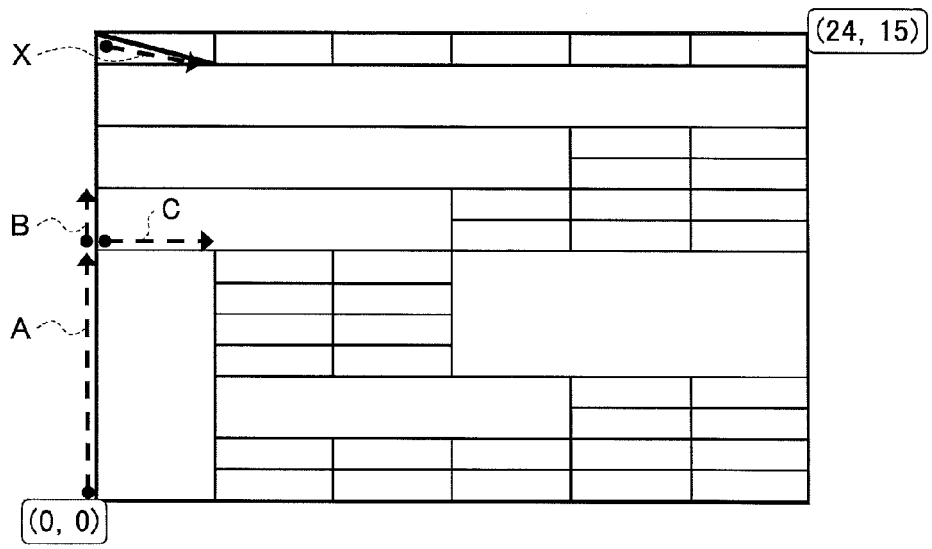

The list of ruled-lines 16A is data in which each of the ruled lines is identified, for example, by a start point and an end point. FIG. 8 is a diagram illustrating a part of ruled lines (a ruled line A, a ruled line B, a ruled line C, and a ruled line X) extracted from an image content. In FIG. 8 and after, assume that the lower-left coordinates of a region enclosed by ruled lines are (0, 0), and the upper-right coordinates are (24, 15).

Also, FIG. 9 is an example of the list of ruled-lines 16A registered in the memory unit 16 or the like. Since the ruled line A and the ruled line B are continuous by having a point (0, 8) as the relay point, they look like a single ruled line as illustrated in FIG. 8. However, they are treated as separate ruled lines in the list of ruled-lines 16A because the point (0, 8) is also a start point of the ruled line C, which is a cross point.

Next, the enlargement preprocess unit 42 deletes tilted ruled lines from the list of ruled-lines 16A (Step S104). At Step S104, the enlargement preprocess unit 42 identifies a tilted ruled line in the list of ruled-lines 16A that has different X coordinates for the start point and the end point, and different Y coordinates for the start point and the end point. In the case illustrated in FIG. 8 and FIG. 9, the ruled line X is identified as a tilted ruled line, and deleted.

Next, the enlargement preprocess unit 42 extracts ruled lines that correspond to outer frame lines of the image content, and assigns information indicating outer frame lines to each of the extracted ruled lines (Step S106). At Step S106, the enlargement preprocess unit 42 extracts the minimum X coordinate, the minimum Y coordinate, the maximum X coordinate, and the maximum Y coordinate among coordinates of start points and coordinates of end points. Then, the enlargement preprocess unit 42 determines ruled lines that constitute the outer frame lines if a ruled line has the start point or the end point whose X coordinate or Y coordinate is equivalent to one of the extracted the minimum X coordinate, the minimum Y coordinate, the maximum X coordinate, and the maximum Y coordinate. FIG. 10 is a diagram illustrating a state where the information indicating outer frame lines are assigned to ruled lines in the list of ruled-lines 16A.

Next, the enlargement preprocess unit 42 generates a list of intersections between ruled-lines 16B from the list of ruled-lines 16A, to register it in the memory unit 16 or the like (Step S108). The list of intersections between ruled-lines 16B can be generated, for example, by excluding the same coordinates from the coordinates of all start points and end points included in the list of ruled-lines 16A. FIG. 11 is a diagram illustrating an example of the list of intersections between ruled-lines 16B generated by the enlargement preprocess unit 42.

Having Steps S100 to S108 executed, the image display apparatus 1 waits until a pen-input for an enlargement command is performed by a user (Step S110). A pen-input for an enlargement command is, for example, an operation of tracing the display screen of the display unit 30 by a pen for a certain length or greater. Assume that the user knows in advance how to issue such an enlargement command by reading a manual or the like.

When the user performs a pen-input for the enlargement command, the trajectory information obtainment unit 44 obtains input trajectory information 16C which is information about a trajectory of coordinates (referred to as an "input trajectory"), and stores it in the memory unit 16 or the like (Step S112). FIG. 12 is an example of the input trajectory information 16C obtained by the trajectory information obtainment unit 44. The input trajectory information 16C includes, for example, information about the initial point and the terminal point of an input trajectory, and the minimum X coordinate (Xmin), the maximum X coordinate (Xmax), the minimum Y coordinate (Ymin), and the maximum Y coordinate (Ymax) among the coordinates of the input trajectory. The input trajectory information 16C also includes information about the coordinates on the input trajectory, for example, plotted for every predetermined distance.

Figure 14:
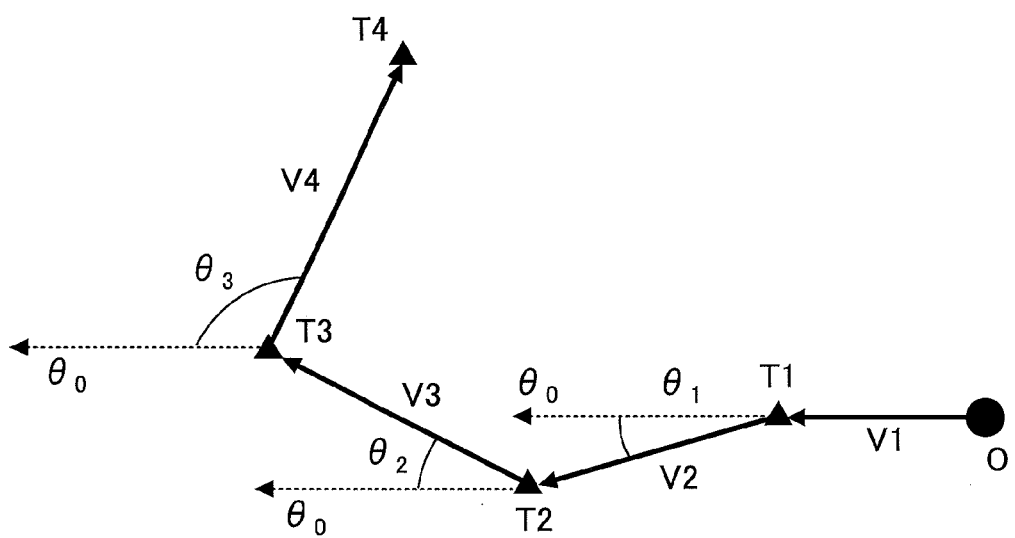
FIG. 14 is a diagram illustrating a relationship among an initial point O, intersections T1, T2, T3, and T4 where a trajectory of coordinates obtained by a pen-input crosses ruled lines in order, vectors V1, V2, V3, and V4, a reference direction $\theta_0$, and angles $\theta_1$, $\theta_2$, $\theta_3$, and $\theta_4$ formed by the vectors relative to the reference direction $\theta_0$.

Next, the intersection list generation unit 46 extracts intersections between the trajectory of the coordinates and the ruled lines with reference to the list of ruled-lines 16A and the input trajectory information 16C, to generate a list of intersections between a trajectory and ruled-lines 16D to register it in the memory unit 16 or the like (Step S114). FIG. 13 is an example of the list of intersections between a trajectory and ruled-lines 16D generated by the intersection list generation unit 46. As illustrated in FIG. 13, in addition to intersections between the input trajectory and ruled lines, the intersection list generation unit 46 stores the initial point and the terminal point of the input trajectory in the list of intersections between a trajectory and ruled-lines 16D. The intersection list generation unit 46 also stores angles of vectors (intersection point (i−1) to intersection point (i)) relative to a reference direction where the vectors are formed by connecting the intersections by order of generation, in the list of intersections between a trajectory and ruled-lines 16D. FIG. 14 is a diagram illustrating a relationship among an initial point O, intersections T1, T2, T3, and T4 where a trajectory of coordinates obtained by a pen-input crosses ruled lines in this order, vectors V1, V2, V3, and V4, a reference direction $\theta_0$, and angles $\theta_1$, $\theta_2$, $\theta_3$, and $\theta4$ formed by the vectors relative to the reference direction $\theta_0$. The reference direction $\theta_0$ is, for example, a direction of the vector V1 from the initial point O to the intersection T1. The angle formed by a vector Vk and the vector V1 is calculated, for example, by dividing the inner product of Vk and V1 by the product of the norms of Vk and V1, and obtaining arccos of it.

Next, the trajectory pattern determination unit 48 classifies the pattern of the trajectory of the coordinates into one of three patterns by the following determination, to determine an enlargement rule used by the enlargement process unit 50 for executing an enlargement process.

The trajectory pattern determination unit 48 first determines whether one or more intersections exist in the list of intersections between a trajectory and ruled-lines 16D, namely, determines whether intersections exist between the input trajectory and the ruled lines (Step S116). If no intersections exist between the input trajectory and the ruled lines, the enlargement process unit 50 executes the enlargement process of pattern (1) (Step S120).

If an intersection exists between the input trajectory and the ruled lines, the trajectory pattern determination unit 48 determines whether the maximum of the angles in the list of intersections between a trajectory and ruled-lines 16D exceeds a threshold (for example, about 120°) (Step S118).

If the maximum angle difference exceeds the threshold, the enlargement process unit 50 executes the enlargement process of pattern (2) (Step S122).

If the maximum angle difference does not exceed the threshold, the enlargement process unit 50 executes the enlargement process of pattern (3) (Step S124).

[Enlargement Processes of Patterns]

[Pattern (1)]

A phenomenon where no intersections exist between the input trajectory and the ruled lines occurs when a user performs a pen-input having an object to specify a part of the region enclosed by the ruled lines of an image content, or when the user draws a line outside of the outer frame lines of the ruled lines.

In the process of pattern (1), the enlargement process unit 50 first obtains region dividing coordinates Xmin*, Xmax*, Ymin*, and Ymax* with reference to the input trajectory information 16C and the list of intersections between a trajectory and ruled-lines 16D. The region dividing coordinates Xmin* is the x coordinate Xi of an intersection in the list of intersections between a trajectory and ruled-lines 16D with which Xmin (minimum in the input trajectory)-Xi takes the minimum positive value. The region dividing coordinates Xmax* is the x coordinate Xi of an intersection in the list of intersections between a trajectory and ruled-lines 16D with which Xi-Xmax (maximum in the input trajectory) takes the minimum positive value. The region dividing coordinates Ymin* is the y coordinate Yi of an intersection in the list of intersections between a trajectory and ruled-lines 16D with which Ymin (minimum in the input trajectory)-Yi takes the minimum positive value. The region dividing coordinates Ymax* is the y coordinate Yi of an intersection in the list of intersections between a trajectory and ruled-lines 16D with which Yi-Ymax (maximum in the input trajectory) takes the minimum positive value.

Figure 15:
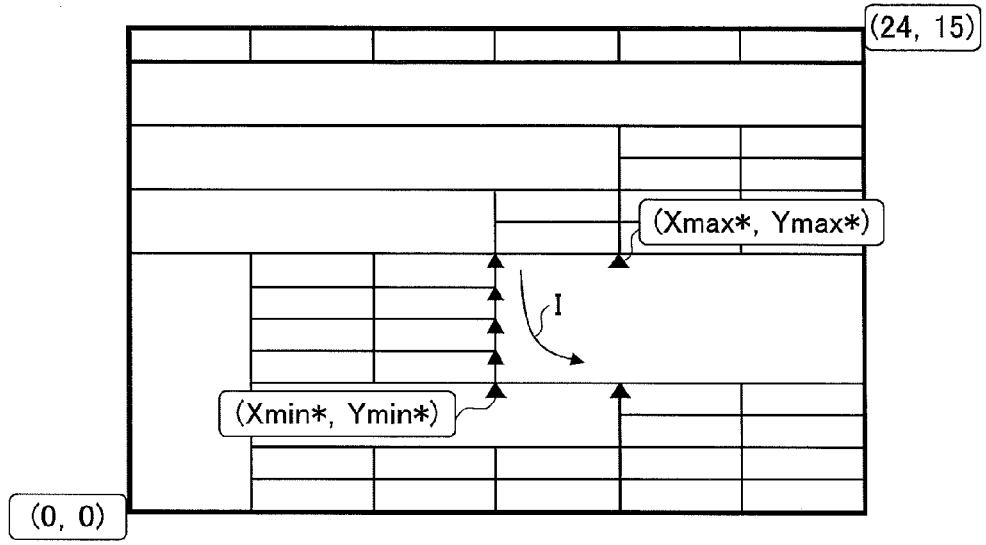
FIG. 15 is a diagram illustrating a state where all region dividing coordinates are obtained.
Figure 16:
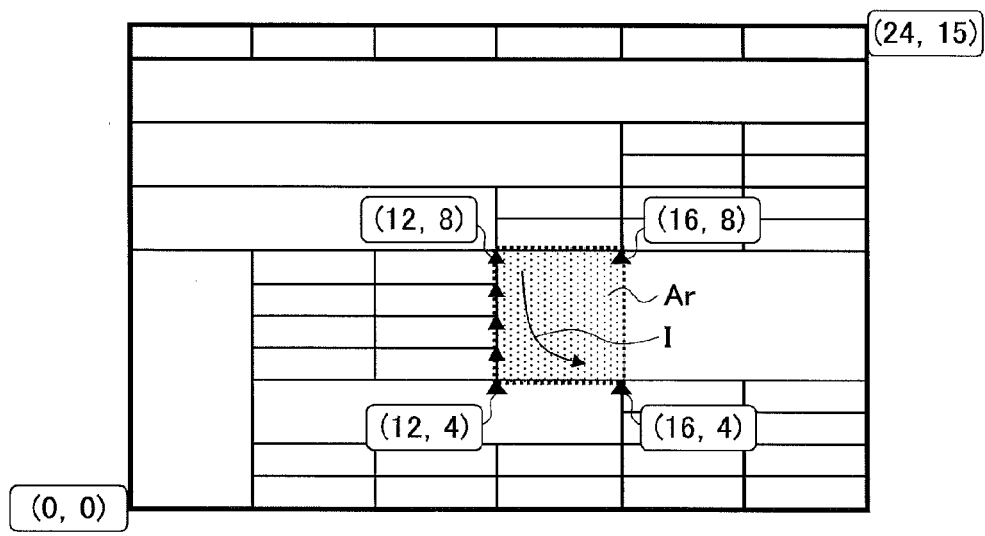
FIG. 16 is a diagram illustrating a region to be enlarged Ar that is enlarged and displayed when all region dividing coordinates are obtained.

When a user performs a pen-input having an object to specify a part of the region enclosed by the ruled lines of an image content, all of the region dividing coordinates Xmin*, Xmax*, Ymin*, and Ymax* can be obtained. FIG. 15 is a diagram illustrating a state where all region dividing coordinates are obtained. In FIG. 15 and after, an input trajectory is denoted by "I", and intersections between ruled lines are denoted by black triangular vertices. When all region dividing coordinates Xmin*, Xmax*, Ymin*, and Ymax* are obtained, the enlargement process unit 50 enlarges and displays a rectangular region having a point (Xmin*,Ymin*) and a point (Xmax*,Ymax*) as its vertices. FIG. 16 is a diagram illustrating the region to be enlarged Ar that is enlarged and displayed when all region dividing coordinates are obtained. In a state illustrated in FIG. 16, the region dividing coordinates of Xmin*=12, Xmax*=16, Ymin*=4, and Ymax*=8 are obtained, and the vertices of the region to be enlarged Ar are (12, 8), (16, 8), (12, 4), and (16, 4).

On the other hand, if not all region dividing coordinates are obtained, it is estimated that the user draws a line outside of the outer frame lines of the ruled lines.

Figure 17:
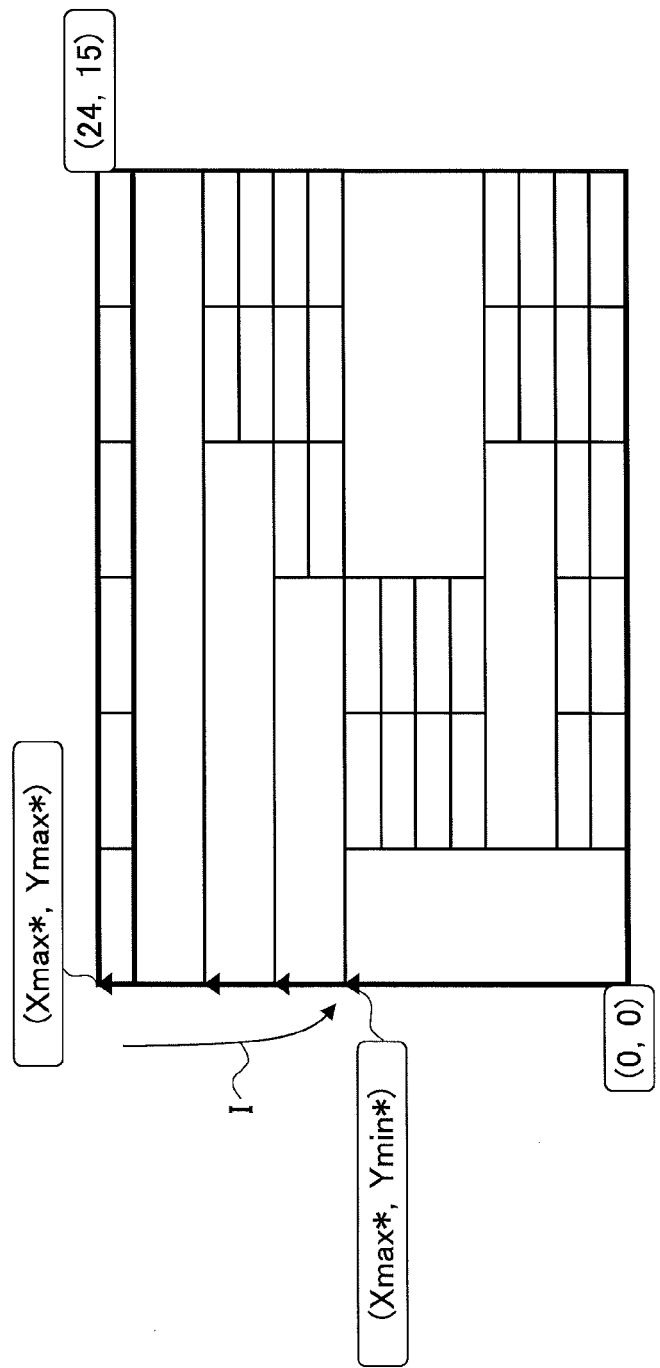
FIG. 17 is a diagram illustrating a state (A) where a user draws a line outside of outer frame lines of ruled lines.
Figure 18:
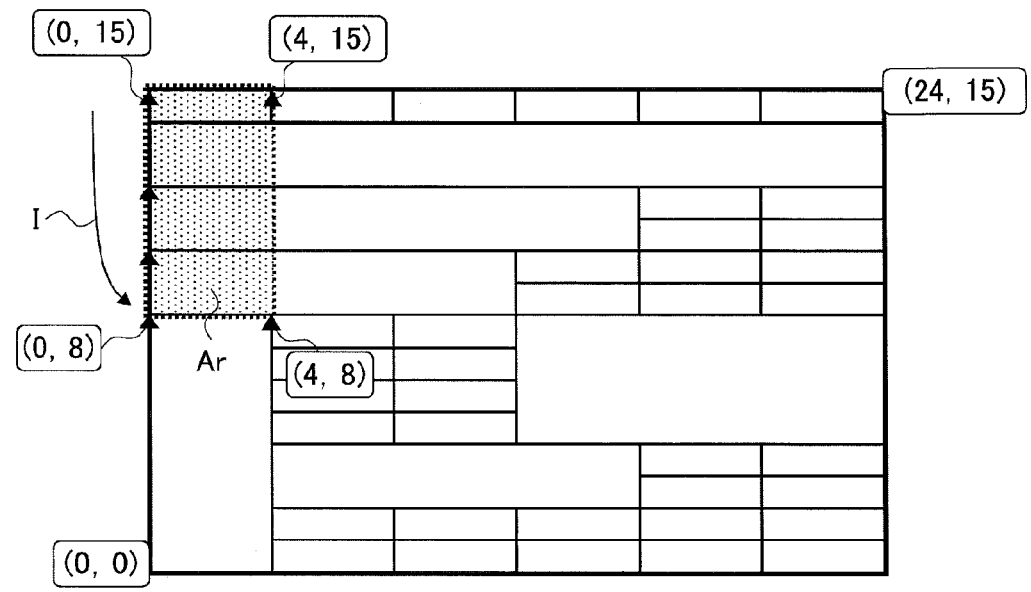
FIG. 18 is a diagram illustrating a region to be enlarged Ar that is enlarged and displayed in a state (A) where a user draws a line outside of outer frame lines of ruled lines.

FIG. 17 is a diagram illustrating a state (A) where a user draws a line outside of the outer frame lines of the ruled lines. In the state (A) illustrated in FIG. 17, one of the region dividing coordinates Xmin* is not obtained, but Xmax*=0, Ymin*=8, and Ymax*=15 are obtained. In the state (A) where one of the region dividing coordinates is not obtained, the enlargement process unit 50 slides vertices in the X direction by one interval. Namely, the enlargement process unit 50 sets the not-obtained region dividing coordinates Xmin* to 0, which is the same as Xmax*, and sets Xmax* to the x coordinate Xi of an intersection in the list of intersections between a trajectory and ruled-lines 16D with which Xi-Xmin* takes the minimum positive value. In this way, for example, the region dividing coordinates Xmin*=0, Xmax*=4, Ymin*=8, and Ymax*=15 are obtained. FIG. 18 is a diagram illustrating the region to be enlarged Ar that is enlarged and displayed in the state (A) where the user draws the line outside of the outer frame lines of the ruled lines. If one of the other region dividing coordinates is not obtained, the enlargement process unit 50 executes substantially the same process.

Figure 19:
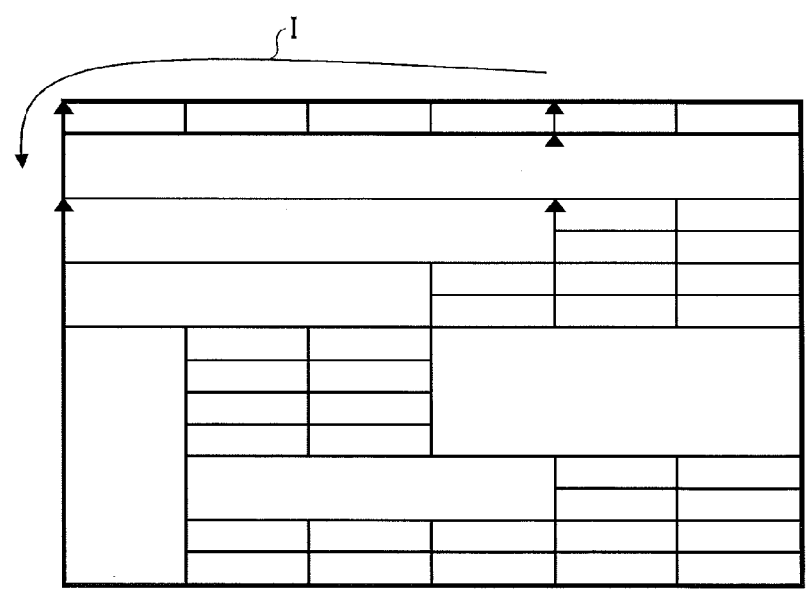
FIG. 19 is a diagram illustrating a state (B) where a user draws a line outside of outer frame lines of ruled lines.
Figure 20:
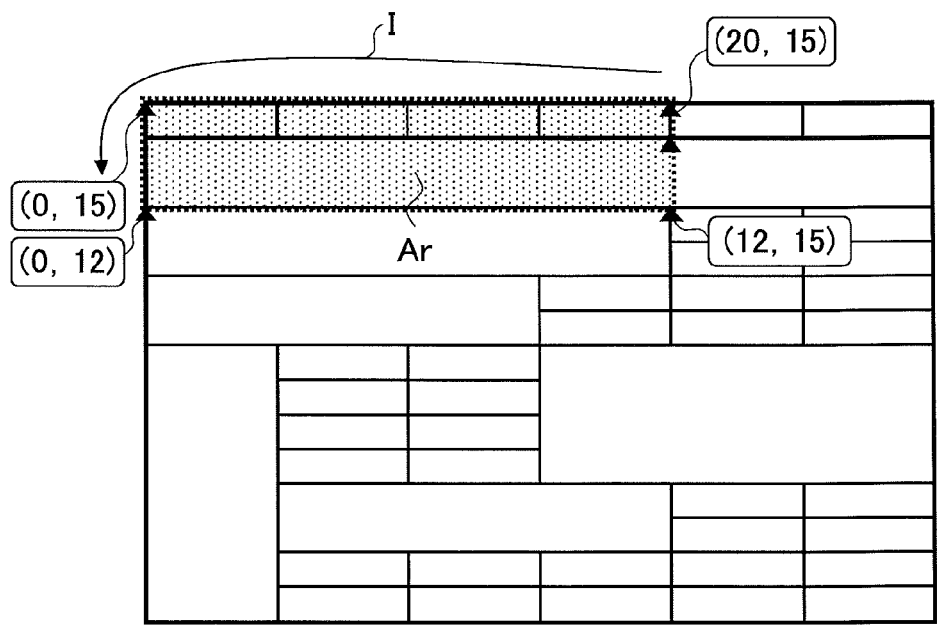
FIG. 20 is a diagram illustrating a region to be enlarged Ar that is enlarged and displayed in a state (B) where a user draws a line outside of outer frame lines of ruled lines.

FIG. 19 is a diagram illustrating a state (B) where the user draws a line outside of the outer frame lines of the ruled lines. In the state (B) illustrated in FIG. 17, the region dividing coordinates Xmin* and Ymax* are not obtained, but Xmax*=20 and Ymin*=12 are obtained. In the state (B) where one of the x coordinates and one of the y coordinates among the region dividing coordinates are not obtained, the enlargement process unit 50 replaces the region dividing coordinates at a terminal part (points on the outer frame lines) of the region enclosed by the ruled lines. Namely, the enlargement process unit 50 substitutes the minimum x coordinate value in the list of intersections between a trajectory and ruled-lines 16D for the not-obtained region dividing coordinate Xmin*, and substitutes the maximum y coordinate value in the list of intersections between a trajectory and ruled-lines 16D for the not-obtained region dividing coordinate Ymax*. Also, if the region dividing coordinate Xmax* is not obtained, the enlargement process unit 50 substitutes the maximum x coordinate value in the list of intersections between a trajectory and ruled-lines 16D for Xmax*, and if the region dividing coordinate Ymax* is not obtained, substitutes the maximum y coordinate value in the list of intersections between a trajectory and ruled-lines 16D for Ymax*. In this way, for example, the region dividing coordinates Xmin*=0, Xmax*=20, Ymin*=12, and Ymax*=15 are obtained. FIG. 20 is a diagram illustrating the region to be enlarged Ar that is enlarged and displayed in the state (B) where the user draws the line outside of the outer frame lines of the ruled lines.

Note that the enlargement process unit 50 executes an error handling process if both region dividing coordinates Xmin* and Xmax* are not obtained; if both region dividing coordinates Yin* and Ymax* are not obtained; if no region dividing coordinates are obtained. In this case, a message may be displayed that states "Enlargement and displaying failed. Perform a pen-input again." or the like.

[Pattern (2)]

When the maximum of the angles $\theta_1$, $\theta_2$, and so on in the list of intersections between a trajectory and ruled-lines 16D exceeds the threshold, it can be estimated that the user performs a pen-input intending to enclose a region.

Figure 21:
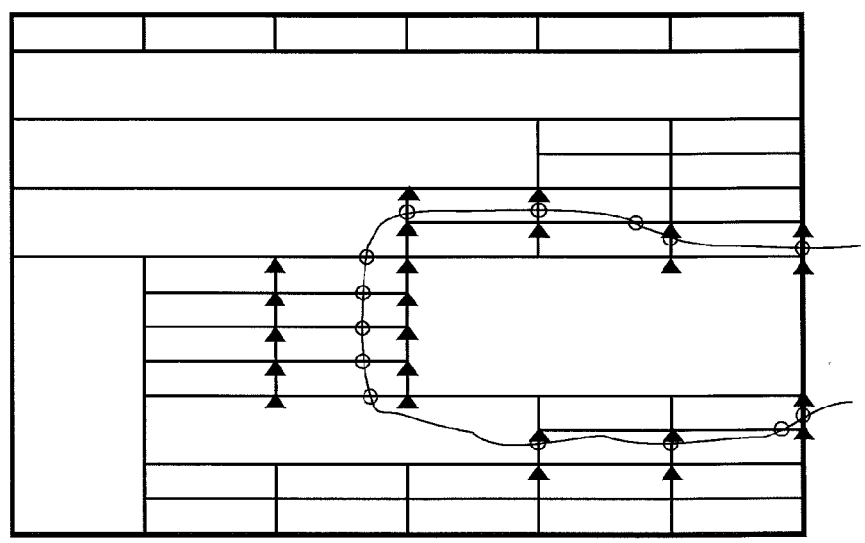
FIG. 21 is a diagram illustrating a state where, for each intersection between an input trajectory and ruled lines, intersections are extracted between adjacent ruled lines.

In the process of pattern (2), the enlargement process unit 50 first extracts adjacent intersections between ruled lines for each of the intersections between the input trajectory and the ruled lines, to generate the list of adjacent intersections 16E, and to register it in the memory unit 16 or the like. FIG. 21 is a diagram illustrating a state where, for each of the intersections between the input trajectory and the ruled lines, adjacent intersections between ruled lines are extracted. In FIG. 21, circles denote intersections between the input trajectory and the ruled lines, and black triangles denote extracted intersections between the ruled lines. The list of adjacent intersections 16E is extracted by searching for coordinates of the start points and end points in the list of ruled-lines 16A using "crossed ruled lines" obtained from the list of intersections between a trajectory and ruled-lines 16D, and by excluding duplicated points.

The enlargement process unit 50 obtains the minimum x coordinate Xmin, the maximum x coordinate Xmax, the minimum y coordinate Ymin, and the maximum y coordinate Ymax from the list of intersections between a trajectory and ruled-lines 16D.

Further, the enlargement process unit 50 classifies the coordinates included in the list of adjacent intersections 16E by determining whether they are inside or outside of a determination region having vertices of (Xmin,Ymin) and (Xmax,Ymax). Note that the enlargement process unit 50 classifies coordinates on a boundary line of the determination region as being inside.

Figure 22:
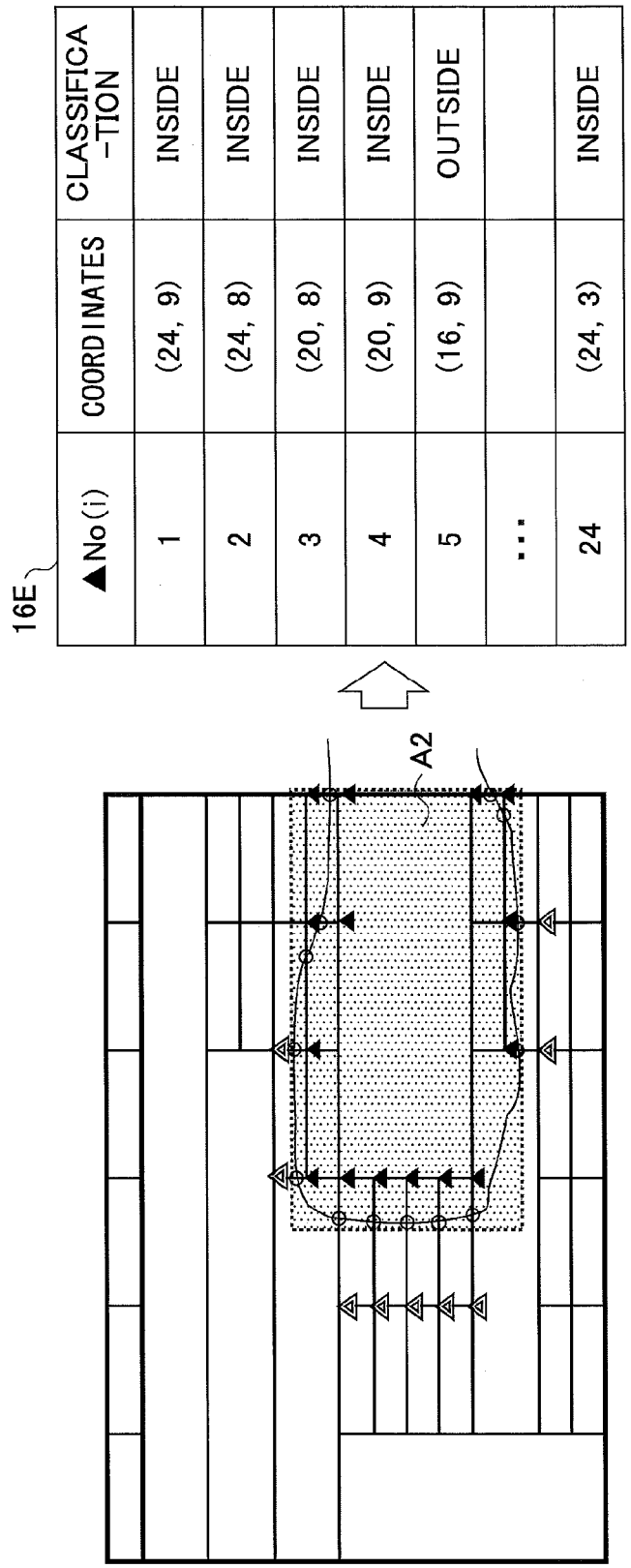
FIG. 22 is a diagram illustrating a state where coordinates included in a list of adjacent intersections 16E are classified, and identification information is added to indicate whether the coordinates are outside of the list of adjacent intersections 16E.

FIG. 22 is a diagram illustrating a state where coordinates included in the list of adjacent intersections 16E are classified, and identification information is added to indicate whether the coordinates are outside of the list of adjacent intersections 16E. In FIGS. 22, 24, 26, 28, and 30, the determination region is denoted by A2, and adjacent intersections classified as being outside of the determination region are designated by double-line triangles.

Then, based on the number and arrangement of intersections inside of the most outer rectangular region, the enlargement process unit 50 obtains the region dividing coordinates Xmin*, Xmax*, Ymin*, and Ymax* based to determine the region Ar to be enlarged and displayed.

(a) If only one adjacent intersection is classified as being inside, the enlargement process unit 50 sets the minimum and maximum coordinates in the list of adjacent intersections 16E to the region dividing coordinates Xmin*, Xmax*, Ymin*, and Ymax* to determine the region to be enlarged Ar (without taking the classification into account). FIG. 23 is a diagram illustrating an example of a list of adjacent intersections 16E for case (a) in pattern (2). Also, FIG. 24 is a diagram illustrating a state where the region to be enlarged Ar is determined for case (a) in pattern (2).

(b) If the x coordinates of the adjacent intersections classified as being inside are all the same, the enlargement process unit 50 selects the region dividing coordinates Xmin* and Xmax* among the adjacent intersections classified as being inside, and selects the region dividing coordinates Ymin* and Ymax* among the adjacent intersections classified as being outside. Namely, the enlargement process unit 50 sets the minimum and maximum x coordinates of the adjacent intersections classified as being inside to the region dividing coordinates Xmin* and Xmax*, and sets the minimum and maximum y coordinates of the adjacent intersections classified as being outside to the region dividing coordinates Ymin* and Ymax*. FIG. 25 is a diagram illustrating an example of the list of adjacent intersections 16E for case (b) in pattern (2). Also, FIG. 26 is a diagram illustrating a state where the region to be enlarged Ar is determined for case (b) in pattern (2).

(c) If the y coordinates of the adjacent intersections classified as being inside are all the same, the enlargement process unit 50 selects the region dividing coordinates Ymin* and Ymax* among the adjacent intersections being inside, and selects the region dividing coordinates Xmin* and Xmax* among the adjacent intersections being outside. Namely, the enlargement process unit 50 sets the minimum and maximum y coordinates of the adjacent intersections classified as being inside to the region dividing coordinates Ymin* and Ymax*, and sets the minimum and maximum x coordinates of the adjacent intersections classified as being outside to the region dividing coordinates Xmin* and Xmax*. FIG. 27 is a diagram illustrating an example of the list of adjacent intersections 16E for case (c) in pattern (2). Also, FIG. 28 is a diagram illustrating a state where the region to be enlarged Ar is determined for case (c) in pattern (2).

(d) If multiple adjacent intersections are classified as being inside, and the x coordinates and the y coordinates are not aligned, the enlargement process unit 50 selects the region dividing coordinates Xmin*, Xmax*, Ymin*, and Ymax* among the intersections being inside. Namely, the enlargement process unit 50 sets the minimum and maximum x coordinates and y coordinates of the adjacent intersections classified as being inside to the region dividing coordinates Xmin*, Xmax*, Ymin*, and Ymax*. FIG. 29 is a diagram illustrating an example of a list of adjacent intersections 16E for case (d) in pattern (2). Also, FIG. 30 is a diagram illustrating a state where the region to be enlarged Ar is determined for case (d) in pattern (2).

Note that the enlargement process unit 50 executes an error handling process if no adjacent intersections exist that are classified as being inside. In this case, a message may be displayed that states "Enlargement and displaying failed. Perform a pen-input again." or the like.

[Pattern (3)]

When the maximum of the angles $\theta_1$, $\theta_2$, and so on in the list of intersections between a trajectory and ruled-lines 16D does not exceed the threshold, it can be estimated that the user performs a pen-input intending to trace a region.

In the process of pattern (3), similarly to pattern (2), the enlargement process unit 50 extracts adjacent intersections between ruled lines for each of the intersections between the input trajectory and the ruled lines, to generate the list of adjacent intersections 16E, and to register it in the memory unit 16 or the like.

Figure 31:
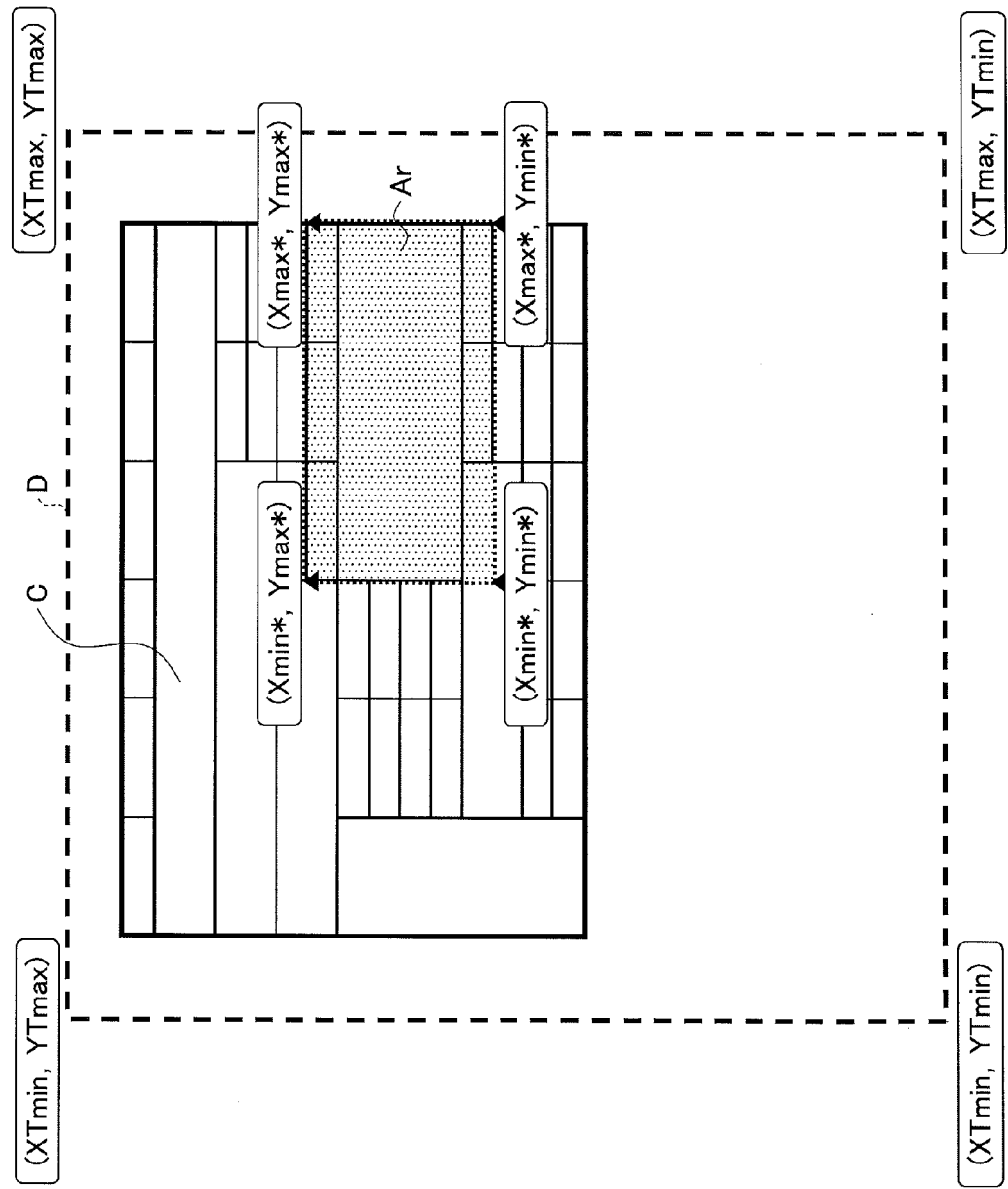
FIG. 31 is a diagram illustrating a relationship among region dividing coordinates Xmin*, Xmax*, Ymin*, and Ymax*, a region to be enlarged Ar, coordinates XTmin, XTmax, YTmin, and YTmax on an outer frame of a display screen D of a display unit 30.

Then, the enlargement process unit 50 sets the minimum and maximum coordinates in the list of adjacent intersections 16E to the region dividing coordinates Xmin*, Xmax*, Ymin*, and Ymax* to determine the region Ar to be enlarged. FIG. 31 is a diagram illustrating a state where the region to be enlarged Ar is determined in a case of pattern (3).

[Process after Region Determination]

Having determined the region to be enlarged Ar, the enlargement process unit 50 determines the display magnification factor from the region to be enlarged Ar and the size of the display screen D of the display unit 30, and makes the display unit 30 display a part of the image content having the region to be enlarged Ar at the center with an appropriate size.

FIG. 31 is a diagram illustrating a relationship among the region dividing coordinates Xmin*, Xmax*, Ymin*, and Ymax*, the region to be enlarged Ar, the coordinates XTmin, XTmax, YTmin, and YTmax in the outer frame of the display screen D of the display unit 30.

If Inequality (1) is satisfied, namely, if the display screen D of the display unit 30 is vertically longer than the region to be enlarged Ar, the enlargement process unit 50 determines the display magnification factor based on Formula (2).

$$(YT\max - YT\min)/(XT\max - XT\min) \geq (Y\max^* - Y\min^*)/(X\max^* - X\min^*) \quad (1)$$

$$(\text{display magnification factor}) = (XT\max - XT\min)/(X\max^* - X\min^*) \quad (2)$$

On the other hand, if Formula (3) is satisfied, namely, if the display screen D of the display unit 30 is horizontally longer than the region to be enlarged Ar, the enlargement process unit 50 determines the display magnification factor based on Formula (4).

$$(YT\max - YT\min)/(XT\max - XT\min) < (Y\max^* - Y\min^*)/(X\max^* - X\min^*) \quad (3)$$

$$(\text{display magnification factor}) = (YT\max - YT\min)/(Y\max^* - Y\min^*) \quad (4)$$

Figure 32:
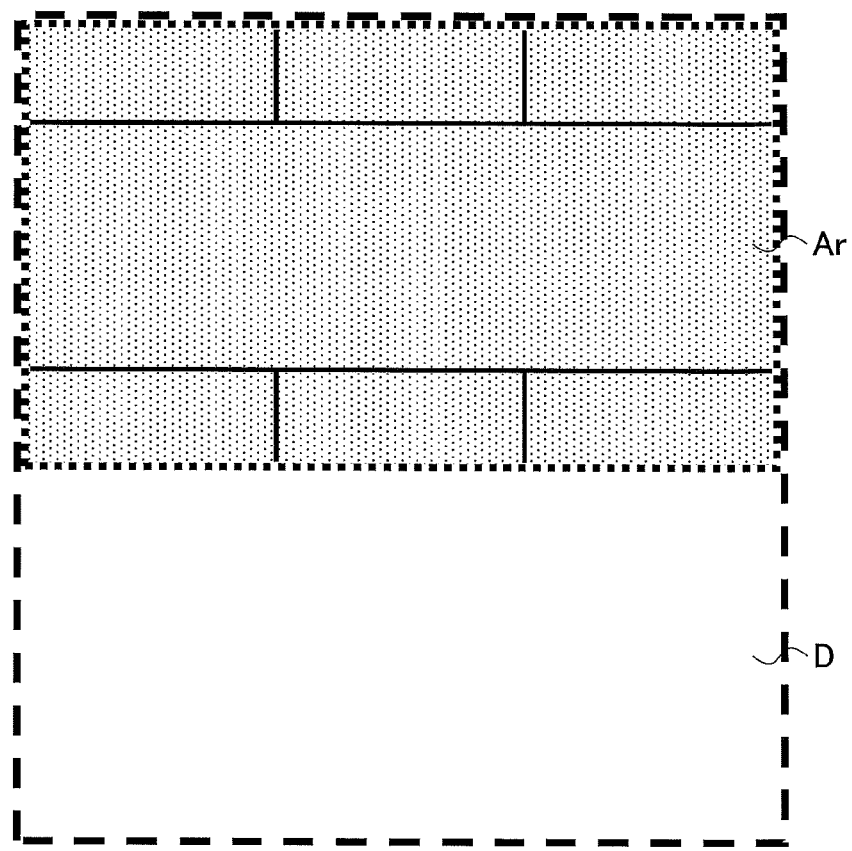
FIG. 32 is a diagram illustrating a state where a region to be enlarged Ar is enlarged and displayed.

The enlargement process unit 50 sets the coordinates (Xmin*,Ymax*) of the region to be enlarged Ar to the upper left of the display screen of the display unit 30, and makes the display unit 30 display a part of the image content having the region to be enlarged Ar at the center by using the display magnification factor determined by Formula (2) or (4). FIG. 32 is a diagram illustrating a state where the region to be enlarged Ar is enlarged and displayed. As illustrated in FIG. 32, the region to be enlarged Ar is displayed maximally enlarged by the display magnification factor while maintaining the aspect ratio.

SUMMARY

The image display apparatus 1 described above can enlarge and display a part of an image that a user wants to see based on an intuitive operation by the user because a pattern, or an enlargement rule, is used for enlargement and displaying that is selected based on the arrangement and existence of intersections between an input trajectory and ruled lines.

Also, the image display apparatus 1 can enlarge and display a part of an image that a user wants to see even appropriately because a region to be enlarged Ar is determined based on a positional relationship between intersections of an input trajectory and ruled lines, and intersections of ruled lines (namely, with ruled lines).

Note that the display unit 30 is an example of a display unit, the normal display control unit 40 and display control unit 22 are an example of an image display unit, the input interface 24 and the trajectory information obtainment unit 44 are an example of an obtainment unit, and the trajectory pattern determination unit 48 and the enlargement process unit 50 are an example of an enlargement unit.

As above, embodiments of an image display apparatus and the like have been described. Further, the present invention is not limited to the specific embodiments described herein, but variations and modifications may be made without departing from the spirit and scope of the present invention.

For example, an operation to input coordinates to indicate a region where a user wants to see is not limited to a pen-input or a touch operation, but a mouse, a touch pad or the like may be used. Also, an image display apparatus is not limited to a tablet-type PC, but may be a note-type or desktop-type PC, a multifunctional cellular phone, or the like.

Also, in the above pattern (2), an enlargement process mode may be selected by a user, with which a process equivalent to that in pattern (3) is executed.

INDUSTRIAL USABILITY

The present invention can be used in the computer industry, the computer software industry, and the electronic device industry, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image display apparatus comprising:
   a display unit;
   a storage unit; and
   a processor configured to execute a process comprising:
      making the display unit display an image including a plurality of ruled lines;

detecting coordinates designated by a user by an input operation on a display screen of the display unit, and to obtain a trajectory of the detected coordinates; and making the display unit enlarge a part of the image including the ruled lines by an enlargement rule selected based on an arrangement of intersections of the trajectory of the obtained coordinates and the ruled lines, and display the enlarged part of the image.

2. The image display apparatus as claimed in claim 1, wherein the processor is configured to execute the process further comprising:

determining a region in the image to be enlarged and displayed by the display unit, based on a positional relationship between the intersections of the trajectory of the obtained coordinates and the ruled lines, and the ruled lines.

3. The image display apparatus as claimed in claim 1, wherein the processor is configured to execute the process further comprising:

when the intersections of the trajectory of the obtained coordinates and the ruled lines do not exist, and coordinates on the trajectory of the obtained coordinates are contained in a region divided by the ruled lines, making the display unit enlarge and display a region including all of the coordinates on the trajectory, the region being minimum among rectangular regions having the ruled lines as at least a part of four sides.

4. The image display apparatus as claimed in claim 1, wherein the processor is configured to execute the process further comprising:

when a maximum angle formed by vectors generated by separating the trajectory of the obtained coordinates at the intersections with the ruled lines, is greater than a predetermined angle, making the display unit enlarge and display a region having vertices inside of the intersections having a minimum or maximum coordinate among the intersections of the trajectory of the obtained coordinates and the ruled lines, the region being selected among rectangular regions having the ruled lines as at least a part of four sides.

5. The image display apparatus as claimed in claim 1, wherein the processor is configured to execute the process further comprising:

when a maximum angle formed by vectors generated by separating the trajectory of the obtained coordinates at the intersections with the ruled lines, is less than or equal to a predetermined angle, making the display unit enlarge and display a region where all intersections between the trajectory of the obtained coordinates and the ruled lines exist are included in the region or exist on a boundary line of the region, the region being selected among rectangular regions having the ruled lines as at least a part of four sides.

6. An image enlargement method executed by an image display apparatus, the method comprising:

making a display unit display an image including a plurality of ruled lines;

obtaining a trajectory of coordinates designated by a user by an input operation on a display screen of the display unit; and making the display unit enlarge a part of the image including the ruled lines by an enlargement rule selected based on an arrangement of intersections of the trajectory of the obtained coordinates and the ruled lines, and display the enlarged part of the image.

7. The image enlargement method as claimed in claim 6, wherein having the image display apparatus determine a region in the image to be enlarged and displayed by the display unit, based on a positional relationship between the intersections of the trajectory of the obtained coordinates and the ruled lines, and the ruled lines.

8. The image enlargement method as claimed in claim 6, wherein when the intersections of the trajectory of the obtained coordinates and the ruled lines do not exist, and coordinates on the trajectory of the obtained coordinates are contained in a region divided by the ruled lines, making the display unit enlarge and display a region including all of the coordinates on the trajectory, the region being minimum among rectangular regions having the ruled lines as at least a part of four sides.

9. The image enlargement method as claimed in claim 6, wherein when a maximum angle formed by vectors generated by separating the trajectory of the obtained coordinates at the intersections with the ruled lines, is greater than a predetermined angle, making the display unit enlarge and display a region having vertices inside of the intersections having a minimum or maximum coordinate among the intersections of the trajectory of the obtained coordinates and the ruled lines, the region being selected among rectangular regions having the ruled lines as at least a part of four sides.

10. The image enlargement method as claimed in claim 6, wherein when a maximum angle formed by vectors generated by separating the trajectory of the obtained coordinates at the intersections with the ruled lines, is less than or equal to a predetermined angle, making the display unit enlarge and display a region where all intersections between the trajectory of the obtained coordinates and the ruled lines exist are included in the region or exist on a boundary line of the region, the region being selected among rectangular regions having the ruled lines as at least a part of four sides.

11. A non-transitory computer-readable recording medium having a program stored therein for causing an image display apparatus to execute a process, the process comprising:

making a display unit display an image including a plurality of ruled lines;

obtaining a trajectory of coordinates designated by a user by an input operation on a display screen of the display unit; and making the display unit enlarge a part of the image including the ruled lines by an enlargement rule selected based on an arrangement of intersections of the trajectory of the obtained coordinates and the ruled lines, and display the enlarged part of the image.

12. The non-transitory computer-readable recording medium as claimed in claim 11, wherein having the image display apparatus determine a region in the image to be enlarged and displayed by the display unit, based on a positional relationship between the intersections of the trajectory of the obtained coordinates and the ruled lines, and the ruled lines.

13. The non-transitory computer-readable recording medium as claimed in claim 11, wherein when the intersections of the trajectory of the obtained coordinates and the ruled lines do not exist, and coordinates on the trajectory of the obtained coordinates are contained in a region divided by the ruled lines, making the display unit enlarge and display a region including all of the coordinates on the trajectory, the region being minimum among rectangular regions having the ruled lines as at least a part of four sides.

14. The non-transitory computer-readable recording medium as claimed in claim 11, wherein when a maximum angle formed by vectors generated by separating the trajectory of the obtained coordinates at the intersections with the ruled lines, is greater than a predetermined angle, making the display unit enlarge and display a region having vertices inside of the intersections having a minimum or maximum coordinate among the intersections of the trajectory of the obtained coordinates and the ruled lines, the region being selected among rectangular regions having the ruled lines as at least a part of four sides.

15. The non-transitory computer-readable recording medium as claimed in claim 11, wherein when a maximum angle formed by vectors generated by separating the trajectory of the obtained coordinates at the intersections with the ruled lines, is less than or equal to a predetermined angle, making the display unit enlarge and display a region where all intersections between the trajectory of the obtained coordinates and the ruled lines exist are included in the region or exist on a boundary line of the region, the region being selected among rectangular regions having the ruled lines as at least a part of four sides.

* * * * *